United States Patent

[11] 3,620,635

| [72] | Inventor | Bert L. DalBianco<br>19632 Adair Drive, Castro Valley, Calif. 94546 |
|---|---|---|
| [21] | Appl. No. | 866,421 |
| [22] | Filed | Sept. 25, 1969 |
| [45] | Patented | Nov. 16, 1971 |

[54] RIVET REMOVING TOOL
6 Claims, 5 Drawing Figs.

[52] U.S. Cl. ................................................. 408/84,
408/112, 408/204
[51] Int. Cl. ............................................... B23b 51/04
[50] Field of Search ........................................... 77/55 G, 69

[56] References Cited
UNITED STATES PATENTS
385,133  6/1888  Perkins................................  77/69

*Primary Examiner*—Francis S. Husar
*Attorney*—William R. Piper

ABSTRACT: A rivet-removing tool in which a hollow cylindrical casing has one end provided with teeth that can contact the head of a rivet when the axis of the casing is aligned with the rivet axis. A chuck is rotated within the casing and has an inner set of teeth that will cut a circular groove in the rivet head when the chuck is moved against the head. The chuck also has an outer set of teeth that are brought into contact with the rivet head for cutting it until the head is severed from the rivet shank whereupon the rivet may be removed.

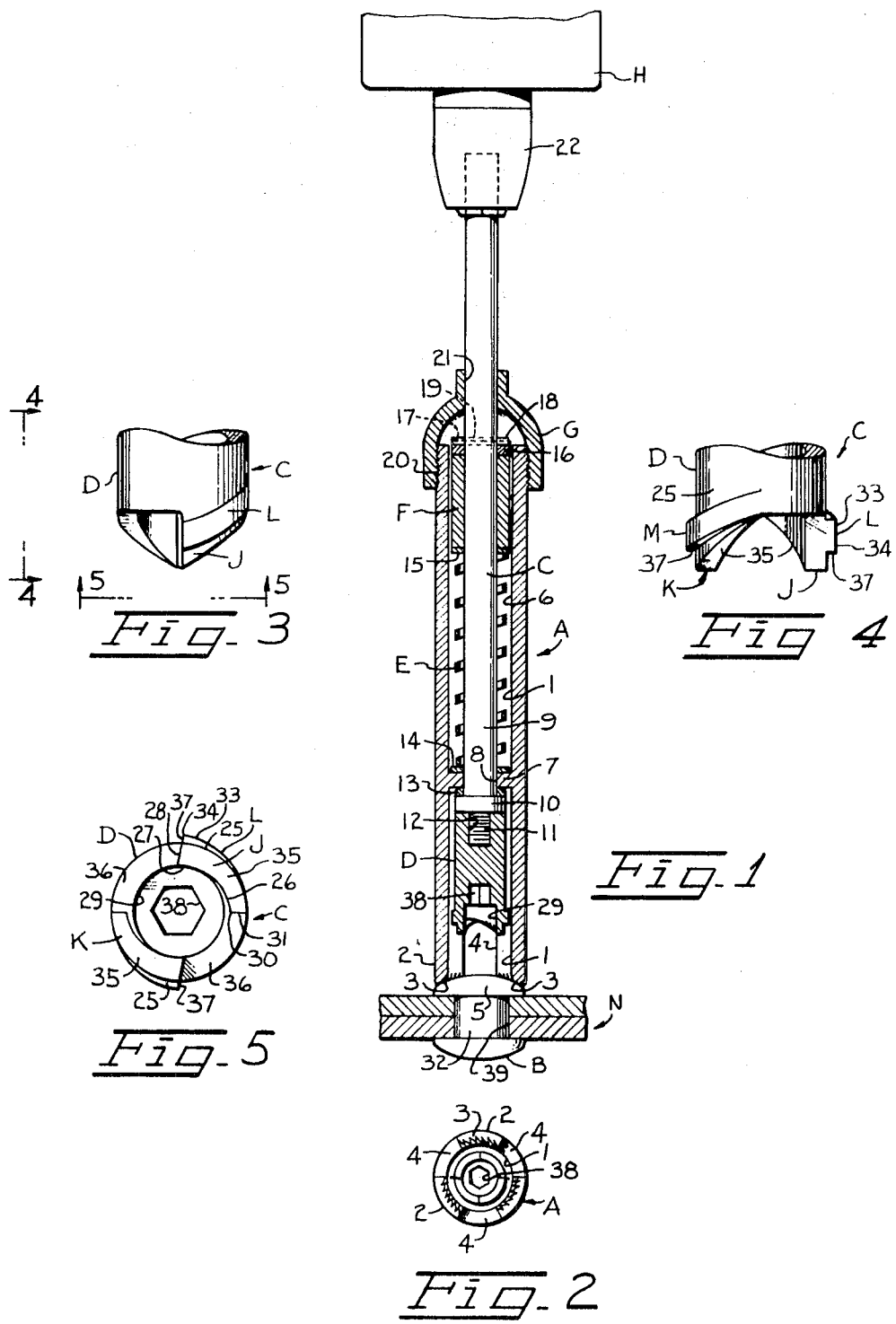

RIVET REMOVING TOOL

An object of my invention is to provide a rivet-removing tool that may be connected to the chuck of an electric drill. The tool has an outer elongated casing that encloses the drill bit and the drill bit head is withdrawn into a bore provided in the outer end of the casing when the tool is not being used. In this way the teeth on the drill bit head are protected by the casing when the tool is not being used and the drill bit can rotate in the casing and can do no harm.

The outer end of the tool casing is provided with longitudinally extending teeth that are designed to contact with the head of a rivet which is to be removed. These teeth prevent the casing from rotating with respect to the rivet and permit the operator to center the tool so that the axis of the rotating bit will be aligned with the axis of the rivet shank. The diameter of the drill bit cutter head is at least equal to the diameter of the rivet shank so that when the drill bit cutter head is moved through the rivet head to cut a hole therein, the rivet head will be severed from its shank as soon as the cutter head reaches the shank and then the rivet can be removed.

I provide cutter heads that may be removably secured to the drill bit stem and these heads have two sets of teeth, one outer set being spaced a predetermined distance from the drill bit axis and being the first to enter the rivet head during the severing of it from the rivet shank and the second set of teeth being spaced a greater distance from the drill bit axis than the first set and positioned to enter the rivet head after the first set. The second or inner set of teeth cut a slightly larger diameter bore in the rivet head than the first set and provide space for the passage of material cut by the first set.

The device is simple in construction and is durable and efficient for the purpose intended.

Other objects and advantages will appear as the specification continues. The novel features of the invention will be set forth in the appended claims.

DRAWING

For a better understanding of my invention, reference should be made to the accompanying drawing, forming part of this specification, in which:

FIG. 1 is a vertical section through the rivet-removing tool and shows it connected to an electric motor and contacting with the head of a rivet.

FIG. 2 is an end view of the tool.

FIG. 3 is an enlarged elevational view of the lower end of the tool bit and illustrates the two sets of outer and inner cutting teeth.

FIG. 4 is an enlarged elevational view of the same end of the tool bit when looking from the left in FIG. 3, as indicated by the arrows 4—4 in the same Figure.

FIG. 5 is a bottom view of the tool bit shown in FIG. 3 when looking in the direction of the arrows 5—5 in the same Figure.

While I have shown only the preferred form of my invention, it should be understood that various changes, or modifications, may be made within the scope of the annexed claims without departing from the spirit thereof.

DETAILED DESCRIPTION

In carrying out my invention I provide a rivet-removing tool that has a casing indicated generally at A. This casing has a bore 1 in its lower end and the cylindrical portion of the casing enclosing the bore is formed into a number of elongated prongs 2 and these prongs are provided with teeth 3 on their lower edges. I show three downwardly extending prongs 2 in FIG. 1 and these are spaced from each other by recesses 4. The teeth 3 are designed to contact with the head 5 of a rivet B that is to be removed. I have shown the head 5 of substantially the same diameter as the outer diameter of the lower end of the casing A although the rivet head may be slightly larger or smaller in diameter just so long as the teeth 3 can engage with the head to prevent relative rotation between the casing and the rivet. The lower edges of the prongs 2 have their inner corners chamfered and the teeth 3 are formed in these chamfered portions.

The casing A is provided with an upper bore 6 that is axially aligned with the lower bore 1. An inwardly extending annular flange 7 is integral with the casing A and provides an opening 8 for slidably receiving the shank 9 of a drill bit C. The inwardly extending annular flange 7 separates the lower bore 1 from the upper bore 6. The drill bit C has an enlarged cylindrical portion 10, see FIG. 1, that is integral with the shank 9 and is slidably received in the lower bore 1. The drill bit also has a threaded cylindrical portion 11 that is axially aligned with the shank 9 and the enlarged cylindrical portion 10. A removable drill bit cutter head D has a threaded bore 12 in the top of the head and this bore receives the threaded extension 11 of the drill bit. I will explain the particular construction of the drill bit head later on in the specification.

A washer 13 is mounted on the shank or stem 9 of the drill bit and it bears against a shoulder formed by the upper end of the enlarged cylindrical portion 10 of the drill bit. The washer 13 also bears against the underside of the inwardly extending annular flange 7 and will act as a bearing between the rotating cylindrical portion 10 and the stationary inwardly extending annular flange 7, carried by the casing A. A second washer 14 is mounted on the shank 9 of the drill bit and this washer bears against the upper surface of the inwardly extending annular flange 7. A coil spring E is mounted on the shank 9 of the drill bit and has its lower end bearing against the upper surface of the washer 14. A bushing F is mounted on the drill bit shank 9 and is received in the upper end of the upper bore 6 of the casing A. A third washer 15 may be placed between the upper end of the coil spring E and the lower end of the bushing F.

A fourth washer 16 is mounted on the drill bit shank 9 and bears against the top of the bushing F. This fourth washer has a pair of diametrically opposed and radially extending half-grooves 17 for receiving a pin 18. This pin is inserted through a transverse bore 19 in the drill bit shank 9 and the ends of the pin are received in the half grooves 17 of the washer 16. This construction will permit the drill bit shank to rotate and to rotate the washer 16, the washer riding on the top of the bushing F. The coil spring E is free to rotate with the shank 9 or not to rotate therewith because the ends of the spring bear against the washers 14 and 15 which in turn respectively bear against the upper surface of the inwardly extending annular flange 7 and the undersurface of the bushing F.

The top of the bushing F preferably lies flush with the upper end of the casing A when the coil spring E holds the cylindrical portion 10 of the drill bit C in its uppermost position. The drill bit head G will be entirely received within the lower bore 1 when the drill bit is in its uppermost position within the casing and therefore the bit is free to rotate within the casing while the drill bit head D is held in the inoperative position. A nut indicated generally at G has a threaded bore 20 that receives the outwardly threaded portion of the top of the casing A. The nut will close the top of the casing and it has a smaller bore 21 for rotatably receiving the drill bit shank 9. The drill bit shank will project above the top of the nut G and it is removably received in a chuck 22 of an electric hand drill H. Before describing the operation of the device, I will now set forth in detail the particular construction of the removable drill bit head D.

The cutting end of the drill bit head D is illustrated in three enlarged views in FIGS. 3, 4 and 5. FIGS. 4 and 5 show the cutting end as having two teeth J and K. Since both of these teeth are identical in construction, a description of the tooth J will suffice for both. In FIG. 5, the tooth J is shown as being arcuate in shape with its outer cylindrical surface 25 having the same diameter and the same center as the outer cylindrical surface of the drill bit head D. The inner cylindrical surface 26 is spirally formed so that the inner corner 27 at the leading edge 28 will be flush with the inner cylindrical bore 29 of the drill bit head. The inner spiral surface 26 of the tooth J gradually extends outwardly in a curve and away from the axis of the drill bit head so that the inner corner 30 of the rear or trailing edge 31 of the tooth J will be spaced outwardly and away from the inner cylindrical surface 29. This will leave a space between the inner spiral surface 26 for the passage of material that is cut from the rivet head by the leading cutting edge 28 of the tooth. It will further be noted from FIG. 5 that the leading cutting edge 28 of the tooth J will be inclined slightly with respect to a radial line extending from the axis of the drill bit head and intersecting the leading corner 27 of the tooth.

The two teeth J and K will initially bore into the rivet head 5 when the drill bit C is rotated by the electric motor H as the operator presses down upon the motor and the drill bit for compressing the coil spring E for moving the drill head D against the rivet head. The operator is careful to place the casing A over the rivet head 5 so that the ends of the elongated prongs 2 will contact with the rivet head and position the axis of the casing A so as to have it practically coincide with the axis of the shank 32 of the rivet B.

I have found that if only the two teeth J and K are used for drilling the rivet head, these teeth will become quickly jammed with material that is cut from the head and the tool will become clogged and will not operate efficiently. For this reason I provide a second set of inner teeth shown at L and M and these are spaced to the rear of the first set of outer teeth J and K. The inner tooth L cooperates with the outer tooth J while the inner tooth M cooperates with the outer tooth K. Both of the inner teeth L and M are identical in construction and therefore a description of the inner tooth L will suffice for both. The teeth K and J are referred to as the outer teeth because they are disposed at the outer end of the drill bit head. The teeth M and L are referred to as the inner or rear teeth since they are disposed in back of the outer teeth.

FIG. 5 shows the outer surface 33 of the inner tooth L as being spirally formed with the leading outer corner 34 of the tooth being spaced further away from the axis of the drill bit head than is the outer cylindrical surface 25 of the outer tooth J. The spiral outer surface 33 of the inner tooth L will merge into the outer cylindrical surface 25 of the drill bit head D at a point which corresponds to the rear edge 31 of the tooth J.

It will further be noted from FIGS. 3 and 4 that the undersurface 35 of the teeth J and K will extend at an angle so that the leading edge 28 of the tooth will be the first to contact with the rivet head. The two teeth J and K are separated from each other by recesses 36.

Also the teeth L and M will extend spirally around the outer cylindrical surface 25 of the drill bit head D and this will provide a leading cutting edge 37, see FIG. 4, for the tooth L which will engage with the rivet head 5 soon after the tooth J has its leading edge 28 initially enter the rivet head. The leading cutting edge 37 for the tooth L will make a larger bore in the rivet head and provide space for the material that is cut by the tooth J. The spaces 4 between the prongs 2 of the casing A are deep enough to permit the passage of material cut from the rivet head 5 by the teeth J and L.

OPERATION

From the foregoing description of the various parts of the device, the operation thereof may be readily understood. The drill bit head is provided with a noncircular recess 38 that is axially aligned with the axis of the head and communicates with the bore 29, see FIGS. 1 and 5. The recess 38 is designed to receive an Allen head wrench, not shown, which may be used for removing the drill bit head D from the threaded cylindrical portion 11 on the drill bit C and for applying another drill bit head to the drill bit and securing it in place. When the shank 9 of the drill bit is mounted in the chuck 22 of the portable electric motor H and the motor is connected to a source of electric current, not shown, the shank 9 will be rotated and will rotate the drill bit head D within the casing bore 1. The coil spring E will hold the drill bit head within the bore and the washers 13, 14 and 15 will permit the drill bit C to rotate within the casing A without doing any harm.

When the device is used for removing a rivet B from two riveted members indicated generally at N, in FIG. 1, the operator places the prongs 2 of the casing A down upon the head 5 of the rivet in such a position that the axis of the tool will substantially coincide with the axis of the rivet shank 32. The electric drill H will rotate the chuck 22 in the drill bit C and the operator can press down upon the electric drill for moving the shank 9 along the interior of the casing A until the first or outer set of rotating teeth J and K contact with the rivet head. These teeth will cut a circular groove into the rivet head as the shank 9 and the drill bit head D are rotated. The material cut from the rivet head by the leading edges 28 of the teeth J and K, will move into the space provided by the spiral inner surface 26 of these teeth. Before the cut material can clog the teeth K and K, the second set of teeth L and M will be brought into contact with the rivet head. The cutting edges 37 of these teeth will widen or enlarge the circular groove being formed in the rivet head so that material cut by the teeth J and K and the additional material cut by the teeth L and M can pass through the recesses 4 between the adjacent prongs 2 of the casing A and be expelled from the casing and from the circular groove in the rivet head.

The operator keeps pressing down upon the drill H until the circular groove formed in the head 5 extends entirely through the thickness of the head and leaves only the central portion of the head that is of the same diameter as the diameter of the rivet shank 32 and is integral therewith. When the operator now removes the casing A from the cut rivet head 5, only a ring of the rivet head remains and this has been severed from the central portion of the head and will fall off from the rivet. The remaining portion of the rivet with its shank 32 may now be removed through the aligned openings 39 in the two members N. The tool operates at a high speed and the severing of the rivet head from its shank can be accomplished quickly. The tool can be used for removing any type of rivet.

I claim:

1. A rivet-removing tool comprising:
  a. an elongated hollow casing having one end adapted to contact with a rivet head;
  b. a drill bit rotatably mounted within said housing and having a drill bit head rotatable therewith;
  c. said drill bit head having an outer set of teeth for drilling a bore in the head of the rivet contacted by said casing when said drill bit is moved longitudinally in said casing for bringing said teeth into contact with the rivet head; and
  d. said drill bit head having a second set of inner teeth spaced in back of the first set of outer teeth for drilling a larger bore in the rivet head for providing space for receiving the material cut by the first set of teeth.

2. The combination as set forth in claim 1, and in which
  a. the end of said casing that is adapted to contact with a rivet head is provided with longitudinally extending prongs that are spaced from each other;
  b. the ends of the prongs having teeth for contacting with the rivet head and the spaces between the prongs permitting the passage of material cut from the rivet head by the two sets of teeth.

3. The combination as set forth in claim 1 and in which
  a. spring means is provided in said casing for yieldingly urging said drill bit to retract said drill bit head within said casing when said drill bit is not being used.

4. In a device of the type described;
  a. a cylindrical drill bit head having a cylindrical recess extending inwardly from its outer end;
  b. an outer set of arcuate cutting teeth at the outer end of said drill bit head, each tooth having a leading cutting edge that extends longitudinally of the head and an inclined arcuate edge that forms a cutting corner at its juncture with said leading cutting edge;
  c. a rear set of arcuate cutting teeth of the same number and spaced rearwardly of said outer set of teeth, each rear tooth being associated with an outer tooth and having a leading cutting edge that extends longitudinally of said head and lies flush with and projects radially beyond the leading cutting edge of the associate tooth;
d. each rear tooth also having an inclined arcuate leading edge that forms a cutting corner at its juncture with the leading cutting edge of said outer tooth.
5. The combination as set forth in claim 4: and in which
a. each rear cutting tooth having an outer arcuate surface that merges into the outer cylindrical surface of said head.
6. The combination as set forth in claim 4, and in which
a. each outer tooth having its inner arcuate surface spiral shaped with its leading edge lying flush with the cylindrical surface of said recess and its trailing edge being spaced at a radially greater distance from the axis of said head than is the radius of said cylindrical recess.

* * * * *